US009936309B2

(12) United States Patent
Johnson et al.

(10) Patent No.: US 9,936,309 B2
(45) Date of Patent: Apr. 3, 2018

(54) SCENE AND STATE AUGMENTED SIGNAL SHAPING AND SEPARATION

(71) Applicant: Alarm.com Incorporated, Vienna, VA (US)

(72) Inventors: Jerald Frederic Johnson, Lawrence, KS (US); Marc Anthony Epard, Lawrence, KS (US); Curtis Scott Crawford, Overland Park, KS (US); Ronald Byron Kabler, Lawrence, KS (US); Alain Charles Briançon, Poolesville, MD (US); Christopher Allen Giacoponello, Pottstown, PA (US); Victor Andres Jara-Olivares, Overland Park, KS (US); Robert Leon Lutes, Lawrence, KS (US); John Berns Lancaster, Lawrence, KS (US)

(73) Assignee: Alarm.com Incorporated, Tysons, VA (US)

( * ) Notice: Subject to any disclaimer, the term of this patent is extended or adjusted under 35 U.S.C. 154(b) by 410 days.

(21) Appl. No.: 14/274,100

(22) Filed: May 9, 2014

(65) Prior Publication Data
US 2015/0326983 A1    Nov. 12, 2015
US 2017/0251309 A9    Aug. 31, 2017

Related U.S. Application Data

(60) Provisional application No. 61/827,235, filed on May 24, 2013.

(51) Int. Cl.
*H04R 25/00*      (2006.01)
*G06F 17/30*      (2006.01)

(52) U.S. Cl.
CPC ....... *H04R 25/50* (2013.01); *G06F 17/30749* (2013.01); *H04R 2225/41* (2013.01); *H04R 2225/43* (2013.01)

(58) Field of Classification Search
CPC ................ H04R 25/43; H04R 2225/39; H04R 2225/41; H04R 2225/55; G01C 21/3697; G06F 17/30241; G06F 17/30749
USPC .............. 700/94; 702/57; 381/312; 340/425, 340/426.1, 435, 438, 517–525, 635
See application file for complete search history.

(56) References Cited

U.S. PATENT DOCUMENTS

| | | | |
|---|---|---|---|
| 8,457,335 B2 * | 6/2013 | Imamura .............. | H04R 25/558 381/312 |
| 2008/0086309 A1 * | 4/2008 | Fischer ................ | H04R 25/407 704/271 |

* cited by examiner

*Primary Examiner* — Jesse A Elbin
(74) *Attorney, Agent, or Firm* — Fish & Richardson P.C.

(57) ABSTRACT

Scene and/or state information may be used to facilitate processing an input to separate one or more signals within the input, to shape the signal within the input, and/or for other processing of the input or signal(s) within the input. A scene determination may be made based upon location data, time data, data describing the received input, or other basis. A state determination may be made based upon the scene determination, properties of a signal itself, or other information such as location, time, etc. By determining an appropriate scene and/or state, processing of an input and/or a signal within an input may proceed in a fashion determined to provide the most valuable information for output. Systems and methods in accordance with the invention may be implemented in a wide variety of baseband processing systems, such as hearing aids and energy consumption monitoring systems.

20 Claims, 7 Drawing Sheets

SCENE AND STATE AUGMENTED SIGNAL SHAPING AND SEPARATION

CROSS-REFERENCE TO RELATED APPLICATIONS

The current non-provisional patent application claims priority benefit, with regard to all common subject matter, of an earlier-filed U.S. provisional patent application titled "STATE AUGMENTED AUDIO SHAPING", Application Ser. No. 61/827,235, filed May 24, 2013. The earlier-filed application is hereby incorporated by reference into the current application in its entirety.

FIELD OF INVENTION

Embodiments of the current invention relate to systems that perform baseband signal processing. More particularly, embodiments of the current invention relate to systems that perform state augmented signal shaping and separation.

DESCRIPTION OF THE RELATED ART

Electronic devices, such as hearing aids and other devices that process baseband signals, may include systems that perform signal processing on an electronic signal that is produced from sound waves encountered by the hearing aid. These systems may reduce noise, but their filtering schemes can create discontinuities in the sound output into the ear. The systems do not take into account the characteristics of a scene, such as a size of the space in which the person wearing the hearing aid is located, whether the person is indoors or outdoors, the presence of noise sources in the vicinity of the person, and similar parameters.

SUMMARY OF THE INVENTION

Systems and methods in accordance with the present invention may facilitate the processing of one or more baseband signals by accounting for the scene corresponding to the receipt of a signal and/or the state of the received signal.

For example, the scene corresponding to the receipt of a signal may be related to the environment in which the signal was received. A scene corresponding to a received signal may alternatively/additionally be related to properties relating to the environment in which a signal was received, such as a taxonomy of events within the environment, events occurring in the environment, the timing or phase of events occurring in the environment, properties of an input or a signal(s) within an input, or other information. In the example of a hearing aid, a scene may be, for example, "outdoors" or "indoors" or any of a wide variety of acoustical environments in which a hearing aid may operate. Of course, systems and method are not limited to use in hearing aids, so scenes in accordance with the present invention are not limited to those corresponding to an acoustical environment. Nor are scenes limited to different physical locations relative to other scenes. For example, some embodiments of the present invention may involve physical units that remain at a single location but experience different scenes at different times or as the environment in which a signal is to be detected changes. Further, systems and methods in accordance with the present invention may receive and process inputs from one or more electronic device, and the one or more electronic device need not be within the same environment or even physically proximate to the system in accordance with the present invention that performs scene and/or state augmented separation and/or shaping of signals within the received input. If more than one electronic device receives inputs with signals to be separated and/or shaped in accordance with the present invention, inputs received by different devices may have different scene and/or state determinations associated with them.

A scene in accordance with the present invention may be determined based upon an observed or measured attribute in a variety of fashions. For example, a global positioning system (GPS) may be used to determine the physical location of a unit, with different physical locations corresponding to different scenes. If location information is used to determine a scene, location determination need not be limited to GPS, By way of example, but not limitation, any sort of beacon, wi-fi based location system, sonar or radar like system, light detection system, or other approach may be used to provide some type of location data for use in a scene determination. In accordance with the present invention, a location may be specific, such as a particular latitude, longitude, and/or elevation, but a location may additionally/alternatively be more general or relative, such as "outside" versus "inside."

A scene may also be determined, at least in part, by a time of day, day of the week, or other temporal consideration. For example, in embodiments of the present invention used in energy and appliance monitoring implementations, a time of day and/or day of the week may indicate a "sleep" scene (for example, between the hours of midnight and 6:00 a.m.), a "morning" scene (for example, between 6:00 a.m. and 9:00 a.m.), a "weekday" scene (for example, between 9:00 a.m. and 6:00 p.m. Monday through Friday), a "weekend" scene (for example, between 9:00 a.m. and 6:00 p.m. on Saturday and Sunday), and an "evening" scene (for example, between 6:00 p.m. and midnight). A temporal consideration used in a scene determination may also be relative, for example an amount of time that has elapsed since the last detection of a particular type of event.

A scene may also be determined using sounds. Sounds used in determining a scene may be within a range typically audible to humans, but may be outside of the range of frequencies and/or volumes typically perceptible to humans. For example, the spectral response of an audio waveform of dishes clanging is distinctive and can be used to determine a "lunch" scene in a house environment. Distinguishing lunch through sounds of silverware and dishes, rather than using speech detection, may be more desirable to users from a privacy perspective. Further, making a scene determination based upon the spectral response of an audio waveform associated with the use of silverware and plates (for example) rather than speech may facilitate a scene determination corresponding to a meal for an individual dining alone. Other types of sounds may be used to determine a scene, and scenes other than a scene corresponding to a meal may be determined. For example, repetitive sounds associated with a washing machine or a dishwasher may be used to determine a "domestic activities" scene. A doorbell ringing may be used to determine a "delivery" or "visitors" scene. Optionally, a detected sound may be used in combination with other information, such as the time of day or other detected environmental conditions, in making a scene determination. For example, detected sounds corresponding to the use of silverware and plates may result in a scene determination of "breakfast" before 11:00 a.m., a scene determination of "lunch" between 11:00 a.m. and 2:00 p.m., and a scene determination of "dinner" between 4:00 p.m. and 9:00 p.m.

A scene may also be determined, at least in part, by the presence (or absence) of other devices, types of devices, or individuals within a defined area. For example, the presence of a mobile phone, a portable computer, or other portable device within a confined area may be at least part of the criteria used to determine a scene. For example, in embodiments of the present invention used in a home automation implementation, the presence of one or more specific cellphones (detected, for example, by registering through an IP address) within the area of a home may indicate an activity in the house, which may then result in a new scene determination such as a "kids back from school" scene or a "ready to go to work" scene.

The determination of an appropriate scene corresponding to a received input may be used to modify processing techniques applied to the input in a fashion suited for the environment encountered within that scene. For example, some scenes may be anticipated to be high noise environments while other scenes may be anticipated to be low noise environments, and therefore those different scenes may benefit from different processes to separate, shape, or otherwise process a signal that may be within an received input.

Further, different scenes may be expected to have different types of signals, so processing techniques may be adjusted to best separate, shape, or otherwise process the anticipated signal(s) for a given environment. For example, in an energy monitoring embodiment of the present invention, a coffee maker may be anticipated to be operating during a "morning" scene, and therefore signal processing may be adjusted to more readily identify the activation of a coffee maker and/or to remove noise from a coffeemaker from other signals that may be detected. As a further example, a scene determination may be made based upon information regarding weather conditions, such that during certain conditions systems and methods in accordance with the present invention may operate to most effectively identify the types of signals most important and/or most likely to be present while readily recognizing signals that may indicate an error requiring an alert of some type. For example, in hot weather the energy consumption of an air conditioning unit may be particularly likely to be important to an energy monitoring system, but operation of a heating system may be indicative of a failure of some kind.

A scene may be determined based upon one or more of a variety of parameters. In the above examples, a location and/or a time may be used to determine a scene corresponding to input(s) that are received. A scene may also be determined based, entirely or in part, upon the input received. For example, a scene corresponding to a received input may be determined based at least in part upon the properties of that input. Properties of an input that may be used to determine a scene corresponding to that input may be, for example, frequencies and/or amplitudes present within that input, or combinations of frequencies and/or amplitudes present within that input. For example, some inputs may have a wide range of frequencies or one or more frequencies having a relatively high amplitude, which may correspond to a "noisy" environment, either in an auditory sense (for hearing aid or audio home monitoring embodiments of the present inventions) or in a general signal processing sense for the present invention.

A state may be determined in addition to a scene, and a determined state may alter the way in which a signal within a received input may be processed. A state may be determined based upon the properties of a detected signal, for example whether the signal falls above or below a given threshold, whether the amplitude and/or frequency of a signal is increasing or decreasing, the rate of increase or decrease of the amplitude and/or frequency of a signal, etc. A state determined may be used, alone and/or in combination with a determined scene, to determine how to optimally process the signal. For example, a signal with an amplitude below a threshold may require a first degree of amplification, while a signal above that threshold may require a second degree of amplification less than the first degree of amplification, and a signal above a second threshold may require attenuation. Of course, more sophisticated variations of signal processing may be implemented for different states determined in systems and methods in accordance with the present invention than varying degrees of amplification and/or attenuation.

Criteria for determining a scene and/or state may be pre-defined in systems and methods in accordance with the present invention based upon the likely use of the system embodying the invention, may be user defined, may be gathered from ancillary data, may be developed by the system or method in accordance with the invention through machine learning or other approaches, or through any combination of these or other approaches. Further, network connectivity may enable updates to systems and methods in accordance with the invention, such as in the definition of criteria corresponding to scene and/or state determinations and/or the signal processing appropriate for a given scene and/or state, from a remote server or other computer device, such as may occur with an Internet connected device receiving software updates from a server.

The scene and/or state determined may be used to determine the process or processes used to separate and/or shape signals within a received input. For example, a received input may contain only a first signal, a first signal and a second signal, and/or a plurality of signals. A received input may also contain noise in varying amounts. A scene and/or state determination may be used to select the most appropriate methodology for separating one or more of the signals within an input from the input, for example to separate the first signal from the input, to separate the second signal from the input, etc. As described herein, a signal may comprise a sound signal (whether or not perceptible to humans), a voltage signal, a radio frequency signal, an optical signal, a vibrational signal, or any other type of signal. One or more signals may be separated from an input and each of those signals may be identified as corresponding to an activity or an appliance. For example, a first signal may correspond to a first consumer activity and a second signal may correspond to a second consumer activity. By way of a further example, a first signal may correspond to the operation of a first appliance, and a second signal may correspond to the operation of a second appliance. The shaping of one or more signal separated from an input may depend upon the scene determination for the input, a state determination, and/or the identification of a particular signal.

Embodiments of the current invention solve problems in and provide a distinct advance in the art of baseband signal processing. More particularly, embodiments of the invention provide systems for performing signal processing that may be utilized with devices such as a hearing aids, voltage monitoring devices, activity/motion monitoring devices, medical monitoring devices, accelerometers, gravitometers, or other types of devices that receive and/or process baseband signals. In accordance with the present invention, a scene and/or state determination may be used to facilitate the identification or separation of multiple signals within a received input from other signals and/or noise within the received input. Further, systems and methods in accordance with the present invention may use a scene and/or state determination to shape one or more signals within an input. Some implementations of the present invention may provide separation of signals, other implementations of the present invention may provide shaping of signals, and other implementations of the present invention may provide both separation and shaping of signals. Systems and methods in accordance with the invention may process signals for purposes beyond separation and/or shaping of signals, and systems and methods in accordance with the invention may process inputs and/or signals within inputs in various ways as part of signal separation and/or processing.

An embodiment of the invention provides a system for scene and/or state augmented signal shaping and separation. The system comprises a receiver, a scene detection element, a state detection element, a separation element, and/or a shaping element. One or more processing element may provide scene detection, state detection, signal separation, signal shaping, and other functions, such as memory management, data storage, communication function, machine learning, or other operations desired for a particular implementation of the present invention. The receiver may receive an input and generate a receiver signal. The input received may be in any form, such as an electrical input, a RF input, a vibration input, a mechanical input, an auditory input, or an optical input, for example. Further, a receiver may receive an input comprising one type of input, such as an electrical input, that is derived from another type of input, such as an auditory input, through an appropriate conversion. The receiver may output a receiver signal that is a monotonic function of the input received. The separating element may identify individual signals, for example representing voices of individual speakers (in a hearing aid example) or representing voltage signatures of individual appliances (in an energy monitoring example) within a receiver signal. The shaping element may receive the receiver signal and/or one or more signals separated by the separating element and may perform a plurality of actions that shape the receiver signal to form an output signal. A processing element may receive the input, receiver signal, separated signals, and/or other information (such as location data, time data, etc.) for use in determining a scene and/or state. The processing element may provide a state machine with a plurality of states. A current state of the state machine may be determined by characteristics of a scene where the system is operating and/or the signal that is received, and the action performed by the shaping element and/or separating element may be selected corresponding to the current state.

A further embodiment of the invention provides an electronic device for state augmented signal shaping and separation. The electronic device comprises an input transducer, a receiver, a shaping element, an output transducer, and a processing element. The input transducer receives audio waves and generates an electronic input signal. The receiver receives the input signal and generates a receiver signal that is a monotonic function of the input signal. The shaping element receives the receiver signal and performs a plurality of actions that shape the receiver signal to form an output signal. The output transducer receives the output signal and generates audio waves. The processing element receives the receiver signal and includes a state machine with a plurality of states. A current state of the state machine is determined by characteristics of a scene where the system is operating, and the action performed by the shaping element is selected corresponding to the current state.

Another embodiment of the invention provides a method for state augmented signal shaping and separation utilizing an electronic device. The method comprises the steps of: receiving an electronic input signal with a receiver and generating a receiver signal which is a monotonic function of the input signal, shaping the receiver signal with a shaping element by performing a plurality of actions that form an output signal, receiving the receiver signal with a processing element that includes a state machine, and transitioning through a plurality of states of the state machine, wherein a current state is determined by characteristics of a scene where the electronic device is operating and wherein the action performed by the shaping element is selected corresponding to the current state.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
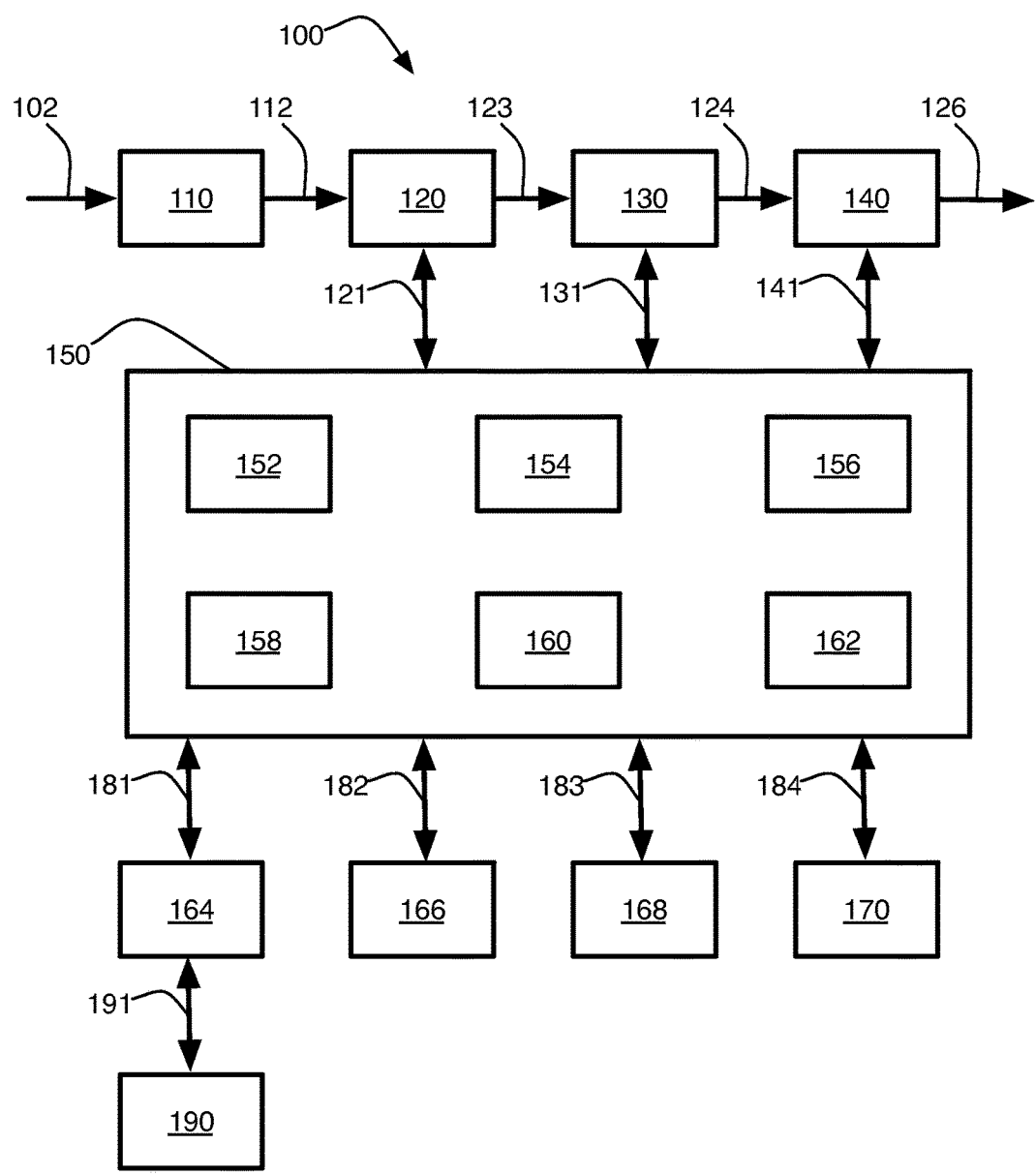
FIG. 1 is a schematic block diagram of a system for scene and/or state augmented signal shaping and separation, constructed in accordance with various embodiments of the current invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Systems and methods in accordance with the present invention may determine a scene corresponding to a received input based at least in part upon information such as the environment corresponding to the received input or properties of that environment. Systems and methods in accordance with the present invention may determine a state at least in part upon properties of at least one signal within a received input. A scene determination may alter the criteria whereby a state determination is made. A determination of a scene and/or state may alter how an input and/or signal(s) within an input are processed. An input or signal(s) within an input may be processed by filtering, amplifying, attenuating, adding other signals, or through any other signal processing technique. Systems and methods in accordance with the present invention may be used in conjunction with any sort of baseband signal processing system or method. While described in particular examples herein, the present invention may be practiced with baseband signal systems other than those described in the present examples. Further, the type and number of inputs received and the number of outputs generated after processing in accordance with the present invention may vary. For example, multiple inputs and multiple outputs may be used within the scope of the present invention, and different forms and formats of signals (auditory, optical, radio wave, electrical voltages or currents, etc.) may be used as an input and/or output in accordance with the present invention.

Scene and/or state determination criteria may be predefined, user provided, periodically updated over a network, and/or learned by the systems and methods in accordance with the present invention. Additionally/alternatively, the present invention may establish in the first instance and/or adjust the signal processing techniques employed using predefined criteria, user inputs, updates received over a network, and/or machine learning. The present invention may utilize Analytics and Machine Learning (clustering) analysis of long term data sets and data sets from multiple sources can be used to incrementally improve signal shaping performance, signal separation, scene identification, power consumption accuracy, and interpretation of measurement instances and long term measurement trends. In one embodiment, this can be done in local storage repositories. In another embodiment, it may be pushed to cloud based platforms where it can be combined with other data sources. Likewise the cloud repository data and analysis may be pulled to local platforms for their usage. Scene determination criteria, state determination criteria, and/or processing techniques or approaches applied may be defined, redefined, and/or altered dynamically.

In some embodiments, data collected, a summary of data collected, various heuristics developed, or other information describing the operation of systems and methods in accordance with the present invention may be exchanged between different devices. For example, multiple energy monitoring units may exchange information with one another, with a computing device (such as a personal computer, a smart phone, a tablet, a television set-top box, a remote server accessed over the Internet or an intranet, etc.). Communication may permit reports, alerts, alarms may be provided to a user via a communication interface (such as a screen, vibrator or speaker) incorporated into devices in accordance with the present invention or computing devices in communication with a system or apparatus or device in accordance with the present invention, such as computing devices like personal computers, smart phones, tablets, television set-top boxes in communication with a television, etc. A user may make selections to control or adjust the operation of systems or methods in accordance with the present invention using such a communication device. Communication by systems in accordance with the present invention may occur using any wired and/or wireless protocol, such as various 802.11x protocols, Bluetooth, ZigBee, 3G, 4G, 5G, etc.

Referring to FIG. 1, a system 100 for state augmented signal shaping and separation, constructed in accordance with various embodiments of the current invention, is shown. The system 100 broadly comprises a receiver 120, a separating element 130, a shaping element 140, and/or a processing element 150 that may provide functions such as scene determination, state determination, data storage, memory management, and other functions, some of which are described below. Receiver 120 may receive an electrical input from a sensor 110. Sensor 110 may optionally receive and convert a non-electrical input 102 into an electrical input 112 for receiver 120. For example, sensor 110 may convert an auditory or optical input 102 to an electrical input 112 for receiver 120. Of course, some types of input may be in an electrical form, in which case sensor 110 may be omitted. In other examples, receiver 120 may comprise a sensor 110 integral to receiver 120. Receiver 120 may provide an electrical signal (either digital or analog) to a separation element 130 and/or a shaping element 140. In the example of FIG. 1, separation element receives separation input 123, and shaping element 140 receives shaping input 124. Separation input 123 and/or shaping input 124 may be received directly from receiver 120 or may be received from other elements, such as separation element 130, shaping element 140, and/or processing element, with or without additional processing by those other elements. Ultimately an output 126 may be provided from system 100. Output 126 may comprise one or more signals identified within input 112, either alone or in combination with other signals, and the one or more signals within output 126 may be separated, shaped, or otherwise processed. Output 100 may be converted from an electrical form to another form, such as auditory or optical, if desired.

The system 100 generally performs baseband signal processing and may be used in conjunction with one or more electronic device. An electronic device may be a hearing aid or other hearing assisted system, an energy monitoring unit, a medical monitoring unit, an activity monitor, or any other type of electronic device. By way of further example, the system 100 may be utilized with other devices or components such as mobile phones, noise canceling headphones, high fidelity audio systems, or other sound reproduction equipment. In addition, the system 100 may be used in general with equipment such as digital subscriber line (DSL) modems, cable modems, wireless routers, and the like.

Figure 2:
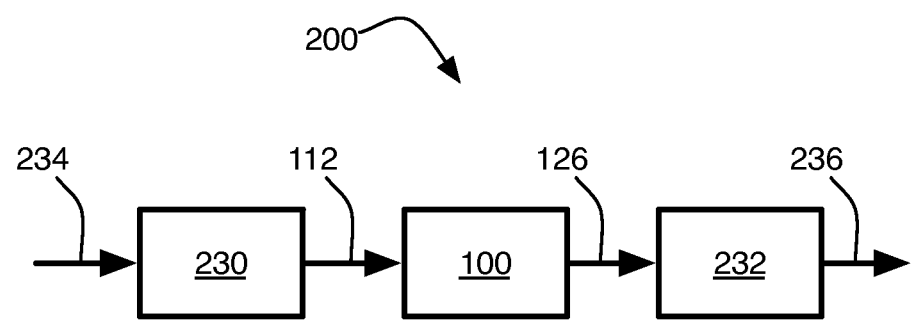
FIG. 2 is a schematic block diagram of an electronic device for scene and/or state augmented signal shaping and separation.

FIG. 2 illustrates an example of the use of a system 200 in accordance with the present invention with a hearing aid. An input transducer 230 generally detects or senses an input 234 to be converted to a signal that is processed by the system 100. With the hearing aid, the input 234 may be a sound to be heard by an individual using the hearing aid. Accordingly, the input transducer 230 may provide microphones, transducing devices such as piezoelectric elements, or other devices or materials that convert mechanical vibrations or forces into an electronic signal, which is typically an analog voltage signal. With other devices, the input 234 may be DSL signals, cable modem signals, wireless signals, powerline signals, and the like. Thus, the input transducer 230, if provided, may have components such as one or more antennas to receive wireless signals, or electronic circuitry such as amplifiers, level shifters, filters, combinations thereof, and the like to receive DSL, cable modem, or powerline signals. In various embodiments, the input transducer 230 may provide combinations of the different types of components. The input transducer 230 may produce the input signal 112. In some embodiments, the input signal 112 may be a single channel signal. In other embodiments, the input signal 112 may have two or more channels, such as a left ear signal and a right ear signal. Examples of systems and methods that monitor energy consumption and operations of electrical appliances with which systems and methods for scene and/or state assisted signal separation and/or shaping may be used are described more fully in the following United States Patent Applications, which are incorporated herein by reference in their entirety: Ser. No. 14/200,692, entitled INDIRECT ELECTRICAL APPLIANCE POWER CONSUMPTION MONITORING AND MANAGEMENT; Ser. No. 14/200,756, entitled "MONITORING AND FAULT DETECTION OF ELECTRICAL APPLIANCES FOR AMBIENT INTELLIGENCE, and Ser. No. 14/200,884, entitled MULTI-NODE ELECTRICAL POWER MONITORING, ANALYSIS, AND RELATED SERVICES.

Still referring to the example of FIG. 2, the output transducer 232 receives the output signal 126 from the system 100 and produces an output 236 that is appropriate for the electronic device. With the hearing aid, the output 236 may be the sound to be delivered into the ear of the individual. Accordingly, the output transducer 232 may provide speakers, transducing devices such as piezoelectric elements, or other devices or materials that convert an electronic signal into sound waves or mechanical vibrations. With other devices, the output 236 may be an electronic signal or a wireless signal and thus, the output transducer 232 may include antennas, amplifiers, buffers, line drivers, combinations thereof, and the like to produce the appropriate wireless or electronic signals.

Referring again to FIG. 1, the receiver 120 receives the input 112 and generates a receiver signal 121 that may be analyzed by processing element 150 for scene and/or state determinations. Further, receiver 120 may provide a receiver signal 123 to a separation element 130 and/or receiver may provide a receiver signal 124 to a shaping element 140. In some examples, one of the separation element 130 and the shaping element 140 may be omitted. Receiver 120 may provide a receiver signal 124 directly to shaping element 140, or alternatively separation element 130 may first operate to identify individual signals from receiver signal 123 and provide those separated signals to shaping element 140 as a receiver signal 124. Whether received from receiver 120 or separating element 130, receiver signal 124 can be shaped by the shaping element 140. Processing element 150 may process receiver signal 121 and interact with/control the operations of one or more of receiver 120, separation element 130, and shaping element 140. The receiver 120 may optionally have amplifier circuits, filter circuits such as low pass filters and/or band pass filters, sampling circuits, analog to digital converters (ADCs), and the like. In general, the receiver 120 may produce or perform a monotonic transformation of the input signal 112. The receiver signals 121, 123, and 124 may be streams of digital values representing the analog input signal 112. Receiver signals 121, 123, and 124 may be identical, but need not be identical. For example, receiver signal 124 provided to shaping element 140 may have received processing by separation element 130. Further, processing element 150 or other additional components may process or otherwise modify a signal before the signal is received by separation element 130, shaping element 140, and/or processing element 150. Further, while separation element 130, shaping element 140, and processing element 150 are depicted in the example of FIG. 1 as discrete elements, in various embodiments they may be distributed across more elements than depicted, combined into fewer elements than depicted, or even combined into a single element. Separation element 130, shaping element 140, and/or processing element 150 may be based upon circuitry or other hardware, software, or a combination of circuitry/hardware and software. Software may be retained or stored in an appropriate computer readable memory and may be executed by an appropriate processor.

The shaping element 140 selectively shapes the receiver signal 124 based on a shaping signal 141 input from the processing element 150. The shaping element 140 may include programmable or nonprogrammable digital signal processing (DSP) circuits, digital to analog converter (DAC) circuits, filter circuits, amplifier circuits, buffer circuits, and the like. The shaping element 140 may receive the receiver signal 123, which is a digitized version of the input signal 112, optionally after separation and/or identification of signals by separation element 130 and/or other processing by processing element 150. The shaping element 140 generally shapes the receiver signal 124 before any desired signal conversion to analog form. Some portions of the receiver signals 124 may be filtered, some portions may be attenuated, while other portions may be amplified. Furthermore, depending on the control data from the processing element 150, the shaping element 140 may do nothing to the receiver signal 124. The shaping element 140 may have a plurality of settings that determine which of the functions the shaping element 140 performs. The shaping signal 141 from the processing element 150 includes information about a plurality of states that select the settings. Optionally, the shaping element 140 may then perform a digital to analog conversion to generate the output signal 126.

Information in addition to a received input 112 may be used for determining a scene and/or state for processing in accordance with the present invention. Any amount and any number of types of additional information may be used in determining a scene and/or state in accordance with the present invention. The example of FIG. 1 shows a first information system 166, which may comprise a location determination element, and a second information system 168, which may comprise a time determination element, but any other type of information systems may be used instead of and/or in addition to those shown in the present example. Further, a scene and/or state determination may be made based solely upon a received input without departing from the scope of the present invention.

Referring to the example of FIG. 1, the location determining element 166 generally determines a current geolocation of the system 100 or a device that provides a signal 112. Location determining element 166 may determine a location in a variety of fashions. For example, location determining element 166 may receive and process radio frequency (RF) signals from a global navigation satellite system (GNSS) such as the global positioning system (GPS) primarily used in the United States, the GLONASS system primarily used in the Soviet Union, or the Galileo system primarily used in Europe. The location determining element 166 may accompany or include an antenna to assist in receiving the satellite signals. The antenna may be a patch antenna, a linear antenna, or any other type of antenna that can be used with location or navigation devices. The location determining element 166 may include satellite navigation receivers, processors, controllers, other computing devices, or combinations thereof, and memory. The location determining element 166 may process a signal 182, referred to herein as a "location signal", from one or more satellites that includes data from which geographic information such as the current geolocation is derived. The current geolocation may include coordinates, such as the latitude and longitude, of the current location of the electronic device or system. The location determining element 166 may communicate the current geolocation to the processing element 150.

Although embodiments of the location determining element 166 may include a satellite navigation receiver, it will be appreciated that other location-determining technology may be used. For example, cellular towers or any customized transmitting radio frequency towers that can be used instead of satellites may be used to determine the location of the system 100 or any device providing an input 112 by receiving data from transmitting locations, typically by receiving data from at least three transmitting locations and then performing basic triangulation calculations to determine a relative position with respect to the transmitting locations. In some instances, triangulation may not be possible, or alternatively triangulation may not be necessary to provide the required level of precision, thereby permitting other types of location data to be used. If triangulation is desired, any standard geometric triangulation algorithm can be used to determine the location. The location determining element 166 may also include or be coupled with a pedometer, accelerometer, compass, or other dead-reckoning components which allow it to determine a location. The location determining element 166 may determine the current geographic location through a communications network, such as by using Assisted GPS (A-GPS), or from another electronic device. The location determining element 166 may even receive location data directly from a user.

A time determination element 168 may provide time of day, day of week, date, or other information for use in determining a scene and/or state for a system 100. For example, in an energy monitoring system installed in a residence, ideally voltage fluctuations detected at 2:00 a.m. may be processed differently than voltage fluctuations processed at 2:00 p.m. Therefore, a time determination may be used to distinguish between different times of day, days of the week, holidays, etc., in order to process detected inputs appropriately using a separation element 130, a shaping element 140, and/or a processing element 150 in accordance with a scene and/or state determination made based at least in part upon a time determination.

The communication element 164 generally establishes communication between the system 100 and external electronic devices 190. The communication element 164 may include signal or data transmitting and receiving circuits, such as antennas, amplifiers, filters, mixers, oscillators, DSPs, and the like. The communication element 164 may establish communication wirelessly by utilizing RF signals, light signals, and/or data that comply with communication standards such as cellular 2G, 3G, 4G, or 5G Institute of Electrical and Electronics Engineers (IEEE) 802.11 standard such as WiFi, IEEE 802.16 standard such as WiMAX, 802.15.1 standard such as Bluetooth™, IEEE 8.02.15 such as ZigBee, ZigWave, or combinations thereof. In addition, the communication element 164 may utilize communication standards such as ANT, ANT+, Bluetooth™ low energy (BLE), the industrial, scientific, and medical (ISM) band at 2.4 gigahertz (GHz), or the like. In some embodiments, in addition or instead, the communication element 164 may establish communication through connectors or couplers that receive metal conductor wires or cables or optical fiber cables.

The memory element 170 may include data storage components such as storage registers, random-access memory (RAM), read-only memory (ROM), programmable ROM, erasable programmable ROM, hard disks, floppy disks, optical disks, flash memory, thumb drives, universal serial bus (USB) drives, or the like, or combinations thereof. The memory element 170 may include, or may constitute, a "computer-readable medium". The memory element 170 may store the instructions, code, code segments, software, firmware, programs, applications, apps, services, daemons, or the like 184 that are executed by the processing element 150. The memory element 170 may also store settings, data, documents, sound files photographs, movies, images, databases, and the like.

The processing element 150 generally acts as a controller that controls the operation of the shaping element 140, and may include a scene estimation element 158, a characterization element 152, a device definition element 160, a device coupling element 162, a heuristics element 156, and a state machine 154. The processing element 150 may receive the receiver signal 121 from receiver 120, and/or may receive signals from separation element 130 and/or shaping element 140. Processing element 150 may interact with separation element 130 via separation signal 131 and/or may interact with shaping element 140 via shaping signal 141. The processing element 150 may also be in communication with the communication element 164, the location determining element 166, and/or the memory element 170. Various embodiments may also generate a characterization signal.

The processing element 150 may include processors, microprocessors, microcontrollers, DSPs, field-programmable gate arrays (FPGAs), analog and/or digital application-specific integrated circuits (ASICs), Fourier or frequency domain transformation circuits, or the like, or combinations thereof. The processing element 150 may generally execute, process, or run instructions, code, code segments, software, firmware, programs, applications, apps, processes, services, daemons, or the like.

In some embodiments, the various elements of the processing element 150 listed above may be implemented as software and/or firmware functions to be executed on a hardware processor. In other embodiments, the various elements of the processing element 150 listed above may be implemented as hardware components such as one or more processors or other electronic circuits. In yet other embodiments, the various elements of the processing element 150 listed above may be implemented as a combination of hardware, firmware, and software.

The scene estimation element 158 receives the receiver signal 121 and/or data 182, 183 from one or more information system (such as first information system 166 and second information system 168) to determine a scene. More than one type of data may be considered in a scene determination, and some scene determinations may be a sub-scene of another scene. For example, if used with a hearing aid, systems and methods in accordance with the invention may consider characteristics such as a location, particularly outdoors versus indoors, in a scene determination. If outdoors, the characteristics may also include the presence or absence of wind. If indoors, the characteristics may further include the size or dimensions of the room (large versus small). In either setting, the scene estimation element 158 may attempt to determine the direction from which signals (i.e., sounds) arrive, the presence or absence of background noise, the type of noise, the frequency spectrum and/or the amplitude of noise, the signal to noise ratio, the context of the situation such as live conversation, phone conversation, listening to music, radio, or television, etc., the language involved, machinery operating in the background, and the like. To estimate the scene or make the determinations listed above, the scene estimation element 158 may perform long term analysis such as averaging the signal over a specific time window. In addition, the scene estimation element 158 may also determine whether the receiver signal 121 is rising or falling as well as the slope of the rise (e.g., the attack time) and the fall (e.g., the decay time). The scene estimation element 158 may also perform sub-band decomposition or coding to separate the receiver signal 121 into a plurality of frequency bands. In some embodiments, the scene estimation element 158 may further perform techniques or methods including correlation, joint probability, point mutual information (PMI), closeness, distance, pseudo-distance measurements, or the like. In other embodiments, such as energy monitoring, a scene may be determined based upon a day of the week (weekday versus weekend, for example), and a subscene may be determined based upon information such as the time of day, while a sub-sub-scene may be determined based upon yet further data, such as whether a signal indicative of an appliance such as a clothing dryer is operating is detected within an input. Similarly, other embodiments may make determinations of a scene or sub-scene (or beyond) based upon information from an input or other source.

The characterization element 152 generally classifies the receiver signal 121 and in turn, the input signal 112. The characterization element 152 may receive data from the scene estimation element 158, the device definition element 160, the heuristics element 156, and the location determining element 166. To classify the receiver signal 121, the characterization element 152 may perform threshold domain filtering multimodal pulse shaping, analog rank filtering, offset rank ordering, analog counting, clustering, singular value decomposition, principal component analysis, independent component analysis, machine learning, k-means analysis, neural network techniques, fuzzy logic techniques, random forest methods, random committee methods, random tree methods, or the like, or combinations thereof. In addition, the characterization element 152 may classify the receiver signal 121 based on a power-law function of a domain parameter of difference between the input signal 112 and the output signal 126. The characterization element 152 may further be able to identify components or subcomponents of the receiver signal 121 as being generated by specific sources such as large or small electrical appliances, heating, ventilation, air-conditioning (HV AC) systems, audio and/or video entertainment systems, or the like. Furthermore, the characterization element 152 may generate the characterization signal 181 which includes data about the input signal 112 produced by the methods listed above. The characterization signal 181 may be transmitted via the communication element 164 to external systems 190 which catalog the data.

The device definition element 160 generally retains information regarding the electronic device or system used with system 100 and may include or access the memory element 170. In the exemplary embodiment, the device definition element 160 may include definitions, characteristics, or parameters of the hearing aid, such as frequency range, input signal dynamic range, output signal dynamic range, and the like. In addition, the device definition element 160 may utilize the communication element 164 in order to retrieve this information 191 from external systems or databases 190.

The device coupling element 162 generally searches for and tries to detect other electronic devices in proximity. The device coupling element 162 may, through transmission and reception of signals utilizing the communication element 164, couple or pair with another electronic device in order to cooperatively perform signal processing. For example, a hearing aid incorporating systems and methods in accordance with the present invention may couple with a smart phone when the user is utilizing the smart phone to have a conversation. The system 100 may initiate communication with, or receive communication from, the smart phone in which the system 100 identifies itself as working with a hearing aid. The smart phone may have a priori knowledge of the hearing aid or may receive parameters from the device definition element 160 of the system 100 regarding the hearing aid, specifying its performance or capabilities. Accordingly, the smart phone may adjust its audio output by filtering, amplifying, and/or attenuating the sound to better match the performance characteristics of the hearing aid. In some embodiments, a system in accordance with the present invention may be integrated into other devices, equipment, or systems, or may be permanently couple to other devices, equipment, or systems, in which case device coupling element 162 may be modified from this example or omitted entirely.

The heuristics element 156 generally provides a plurality of rules, or an algorithm, governing the behavior of one or more of the processing element 150, the state machine 154, a scene estimation element 158, or other processing elements. The heuristics element 156 may receive data from the scene estimation element 158, the characterization element 152, the device definition element 160, and the location determining element 166 and may provide one or more outputs for the state machine 154. The rules may be preprogrammed and stored in the memory element 170, may be provided by a hardware combinational logic architecture, or a combination thereof. In addition or instead, the rules may be retrieved from external systems 190 via the communication element 164.

The rules may depend on, among other things, the nature of the receiver signal 121, the performance parameters of an electronic device or other system/environment providing an input, a location, a time or date, or any other information. For example, the scene estimation element 158 may indicate whether the receiver signal 121 is rising or falling and how quickly the receiver signal 121 is changing, which may have an effect on how the shaping element 140 should shape the receiver signal 121, and thus, the state of the state machine 154. Also, noise may be detected in the receiver signal 121, which may be attenuated by the shaping element 140 depending on the state of the state machine 154. In addition, the location determining element 166 may indicate whether the electronic device 28 is indoors or outdoors, based on its geolocation. Furthermore, the location determining element 166 may indicate that an electronic device providing an input is in motion or traveling. All of these location aspects may affect how the shaping element 140 shapes the receiver signal 121, and in turn, the state transitions of the state machine 154.

The state machine 154 generally controls the operation of the shaping element 140 based on the nature of the input 112, the parameters of the electronic device or system or environment providing an input 112, and heuristics governing the behavior of the processing element 150. The state machine 154 may include, or be formed from, the hardware components listed above for the processing element 150. In addition or instead, the state machine 154 may be formed from hardware components such as data storage registers and discrete combinational logic. Furthermore, in some embodiments, the state machine 154 may be asynchronous. In other embodiments, the state machine 154 may be synchronous and may include or be in communication with clock circuitry or other timing circuitry which generates a periodic, typically square wave, signal. In some embodiments, the state machine 154 may also be implemented as firmware or software.

In various embodiments, the state machine 154 may include a plurality of separate state machines, each one configured to perform a different function or operate in a different environment. Possible state machines 154 could include a scene state machine, an event state machine, a phase state machine, and an amplitude state machine.

Figure 3:
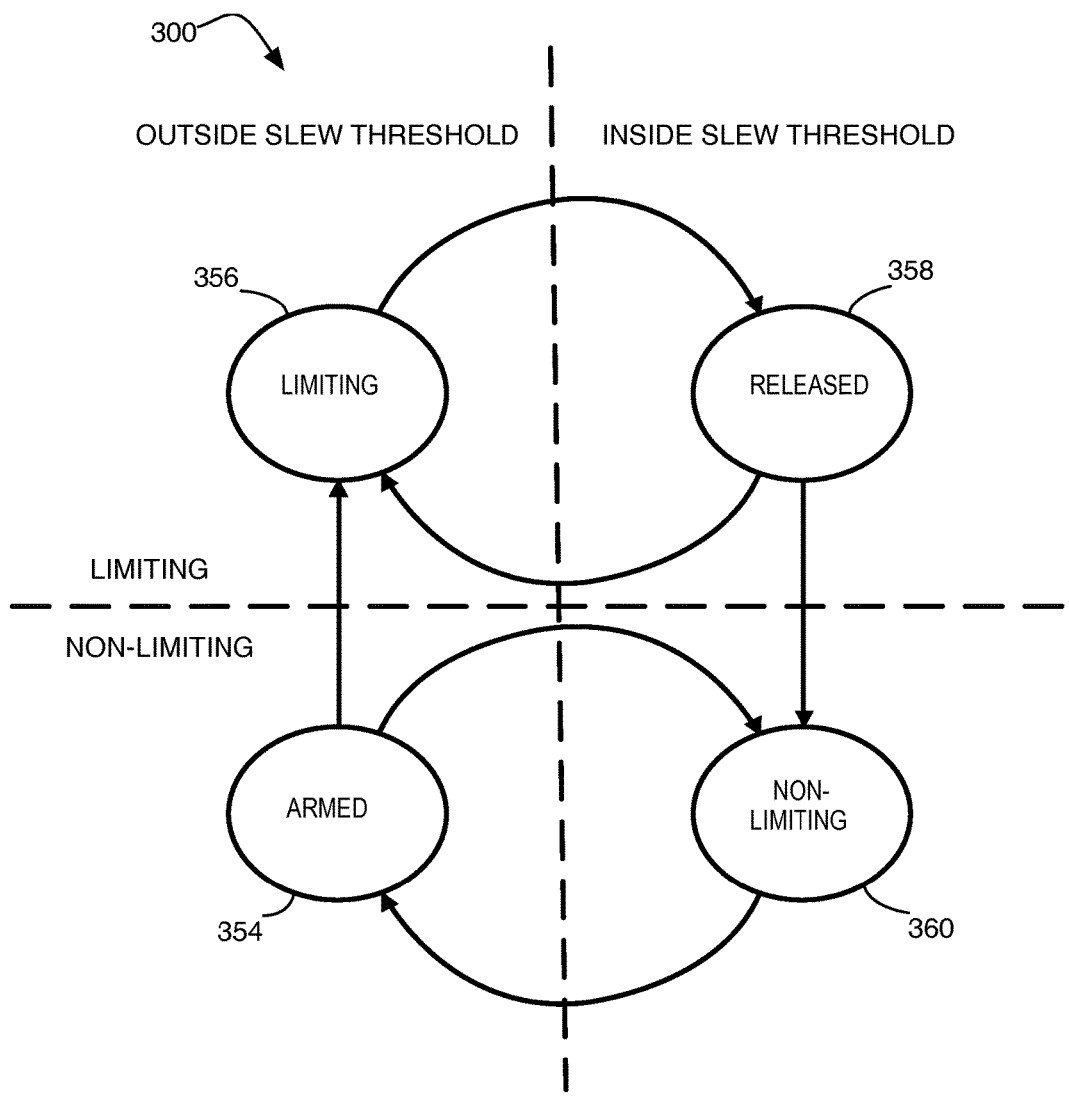
FIG. 3 is a state diagram for a state machine that may be a component of the system of FIG. 1.

In an exemplary embodiment, the state machine 154 includes a single state machine with four states, as shown in the state diagram 300 in FIG. 3, that trigger functions of the shaping element 140. The state machine 154 may have a greater number or a lesser number of states depending on the operation of the shaping element 140. The states may include a first state 354, a second state 356, a third state 358, and a fourth state 360. If the state machine 154 is synchronous, then the state machine 154 may exist in one state per clock cycle or period that is received from the clock circuitry. Furthermore, the state machine 154 may transition from one state to the next state as the clock cycle changes.

The state machine 154 may receive data from the scene estimation element 158, the characterization element 152, the device definition element 160, and the heuristics element 156 that, at least in part, determines the transitions from state to state. In addition, the scene where the system 100 is located, the event (including the audio of interest and the type of noise present), the time or dynamics (such as increasing or decreasing in amplitude) of the receiver signal 121, and the amplitude (such as above or below a threshold) of the receiver signal 121 contribute to determining the next state of the state machine 154.

The first state 354 may be an armed state in which the shaping element 140 is not currently shaping the receiver signal 124. The state machine 154 may transition to the second state 356 or the fourth state 360 depending upon the content of the receiver signal 121 and the data from the other elements. One exemplary condition for transitioning to the second state 356 is that the input signal 112 includes a sufficient amount of noise or other undesirable characteristics so that the receiver signal 121 requires shaping by the shaping element 140. One exemplary condition for transitioning to the fourth state 360 is that the input signal 112 does not include a sufficient amount of noise or other undesirable characteristics.

The second state 356 may be a limiting state in which the input signal 112 previously included a sufficient amount of noise or other undesirable characteristics and so the shaping element 140 is currently shaping the receiver signal 124. The state machine 154 automatically transitions to the third state 358 as the next state.

The third state 358 may be a released state in which the shaping element 140 is currently shaping the receiver signal 124. The state machine 154 may transition to the fourth state 360 or the second state 356 depending upon the content of the input signal 112 and the data from the scene estimation element 158, the heuristics element 156, and the characterization element 152. One exemplary condition for transitioning to the second state 356 is that the input signal 112 includes a sufficient amount of noise or other undesirable characteristics so that the receiver signal 124 requires shaping by the shaping element 140. One exemplary condition for transitioning to the fourth state 360 is that the input signal 112 does not include a sufficient amount of noise or other undesirable characteristics.

The fourth state 360 may be a non-limiting state in which the input signal 112 previously did not include a sufficient amount of noise or other undesirable characteristics and so the shaping element 140 is not currently shaping the receiver signal 124. The state machine 154 automatically transitions to the first state 54 as the next state.

The state machine 154 outputs the shaping signal 40 to the shaping element 140. The shaping signal 40 may include a single signal or line that indicates the state of the state machine 154. Alternatively, the shaping signal 141 may include multiple signals to indicate the state of the state machine 154 or other information as well.

The system 100 may function as follows. The receiver 120 may receive the input signal 112. In the exemplary embodiment of the electronic device providing a signal being a hearing aid, the input signal 112 may be an analog signal corresponding to the audio detected by the input transducer 230. The receiver 120 may perform an analog to digital conversion on the input signal 112 to produce the receiver signals 121, 123, 124 which is communicated to the processing element 150, the separation element 130, and the shaping element 140 respectively.

The scene estimation element 158 of the processing element 150 may receive the receiver signal 121 and may perform averaging or similar techniques as well as determine frequency components of the receiver signal 121 in order to determine the scene or context in which the system 100, and in turn the hearing aid, is being used. Data from the scene estimation element 158 may be passed on to the characterization element 152 and the state machine 154, among others.

The characterization element 152 may receive input from the scene estimation element 158, the device definition element 160, the heuristics element 156, and the location determining element 166. Based on the input, the characterization element 152 may classify the receiver signal 38 and may identify the source of various signal components or subcomponents. The classification and identification data may be presented to the state machine 154 and the device definition element 160 as well as transmitted to external systems 190 through the communication element 164.

The heuristics element 156 may receive input from the scene estimation element 158, the characterization element 152, the device definition element 160, and/or one or more information providing elements 166, 168. Based on the input, the heuristics element 156 may control one or more outputs that are provided to the state machine 154. The outputs may change based on the nature of the receiver signals 121, 123, 124, the performance parameters of an electronic device or other system or environment providing an input, a location, a time, etc.

The state machine 154 may receive input from the scene estimation element 158, the characterization element 152, and the heuristics element 156. The state machine 154 may include four states and the state transitions, as shown in FIG. 3, but may provide more or fewer than shown in this example. The inputs determine how the state machine 154 transitions from state to state. For example, if the state machine 154 is in the first state 354, then the state machine 154 transitions to the second state 356 or the fourth state 360 depending on the inputs, as described in more detail above. The state machine 154 may output the shaping signal 141 that includes information about the current state.

The shaping element 140 may receive the shaping signal 141 and shape the receiver signal 124 in order to form the output signal 126. The shaping element 140 may include settings that direct it to filter, amplify, attenuate, or otherwise modify the receiver signal 124. The setting is selected according to the state of the state machine 154 included or encoded in the shaping signal 141.

Figure 4:
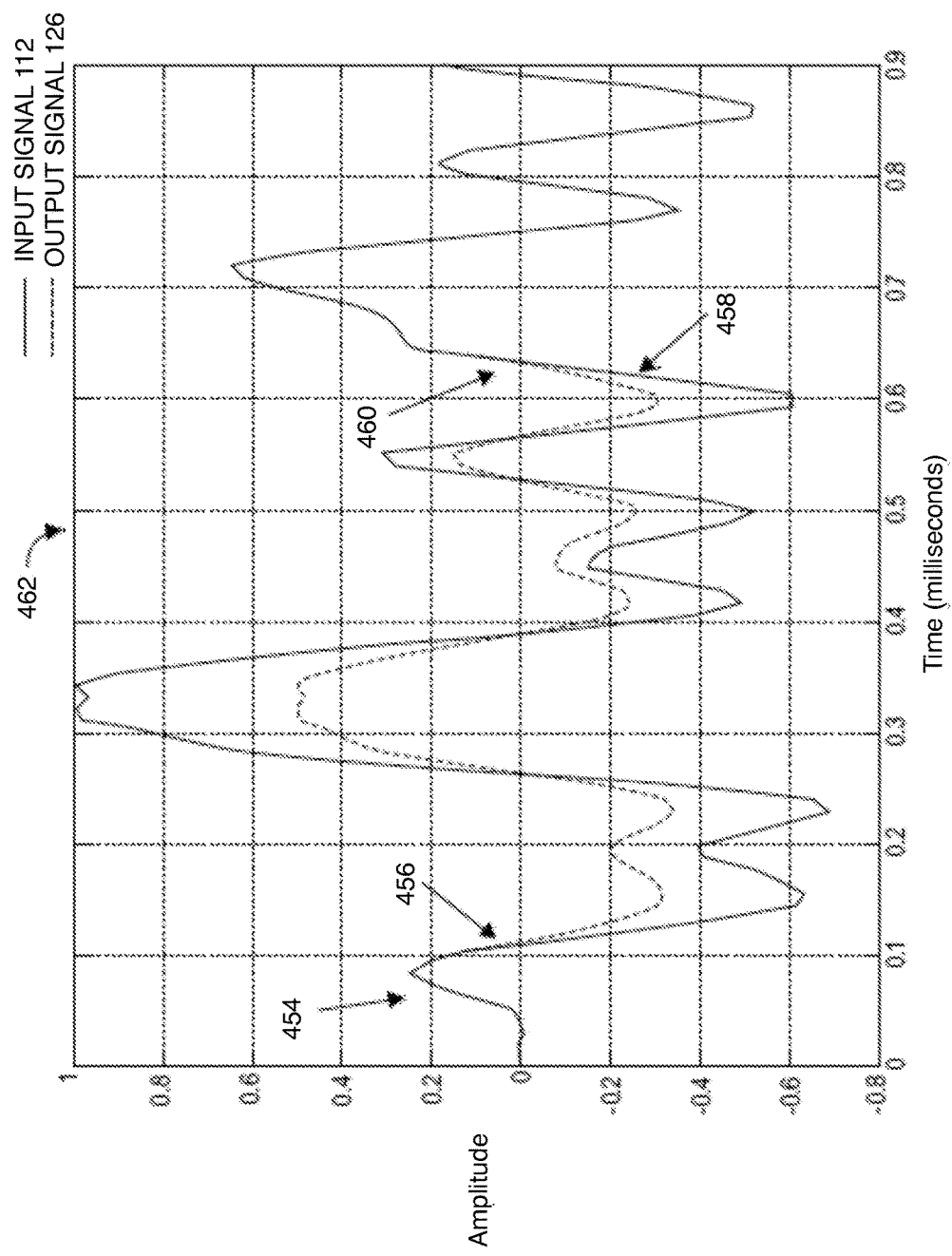
FIG. 4 is an exemplary plot of an amplitude vs. time for an input signal and an output signal of the system of FIG. 1.

An example of the operation of the system 100 is shown in a plot 462 in FIG. 4. The plot 462 shows the amplitude vs. time for the input signal 112 and the output signal 126. From a time of 0 seconds to approximately 0.1 milliseconds (ms), the state machine is in the first state 454, and so the shaping element 140 does not significantly shape the receiver signal 124. As a result, the output signal 126 is substantially the same as the input signal 112. From a time of approximately 0.1 ms to approximately 0.6 ms, the state machine 154 is in the second state 456, which, for this embodiment of the system 100, directs the shaping element 140 to attenuate the receiver signal 124. Thus, the output signal 126 is a lower amplitude version of the input signal 112. From a time of approximately 0.6 ms to approximately 0.63 ms, the state machine 154 is in the third state 458, which discontinues the attenuation of the receiver signal 124. At a time of approximately 0.63 ms, the state machine 154 is in the fourth state 460, which directs the shaping element 140 to not shape the receiver signal 124. As a result, the output signal 126 is substantially the same as the input signal 112. After a period of time, the state machine 154 may transition back to the first state 454.

In various embodiments, the system 100 may also search for other electronic devices that are operating in the vicinity of the system 100. The device coupling element 162 may utilize the communication element 164 to communicate with the other device in order to establish pairing or coupling between the system 100 and the other device. Once the two are paired, the device definition element 160 may transmit operating parameters of the electronic device related to the system 100 to the other electronic device. Accordingly, the other electronic device may modify its performance to better match the capabilities of the system 100 or the electronic device with which the system 100 is utilized. With the hearing aid, the system 100 may be paired with a smart phone, for example. The smart phone may filter, amplify, and/or attenuate the audio that it produces in order to match the hearing aid's dynamic range and frequency response.

The example depicted in FIG. 1 and described herein is exemplary only. The components and/or elements in the example of FIG. 1 may be omitted or combined without departing from the scope of the present invention, and additional components and/or elements may be added without departing from the scope of the present invention. Further, the types and numbers used to determine a scene and/or state may differ from the examples described herein, and the criteria used to determine the appropriate scene and/or state may differ from the examples described herein.

Figure 5:
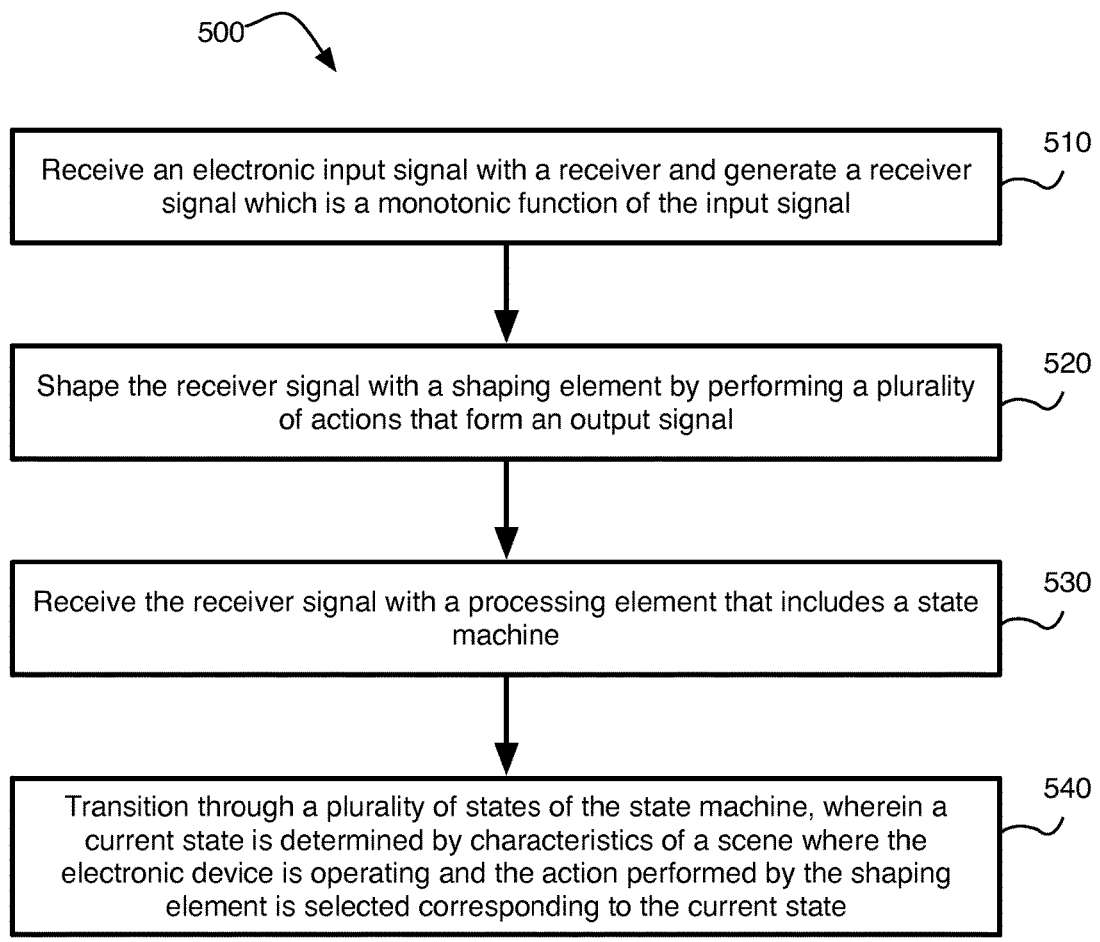
FIG. 5 is a flow diagram of at least a portion of the steps of a method for state augmented signal shaping and separation utilizing an electronic device.

At least a portion of the steps of a method 500, in accordance with another embodiment of the current invention, for state augmented signal shaping and separation of signals is shown in FIG. 5. The steps may be performed in the order presented in FIG. 5, or they may be performed in a different order. In addition, some of the steps may be performed simultaneously instead of sequentially. Furthermore, some steps may not be performed.

Referring to step 510, an electronic input signal 112 is received with a receiver 120 and a receiver signal is generated. The receiver 120 may include circuitry such as amplifiers, filters such as low pass filters and/or band pass filters, samplers, ADCs, and the like. The receiver 120 may perform an analog to digital conversion on the input signal 112. The receiver signal 38 may be a monotonic function of the input signal 112.

Referring to step 520, the receiver signal 124 is shaped by a shaping element 140 by performing a plurality of actions that form an output signal 126. The shaping element 140 may include circuitry such as programmable or nonprogrammable DSPs, DACs, filters, amplifiers, buffers, and the like. The shaping element 140 may filter, amplify, attenuate, or otherwise modify the receiver signal 124 in order to generate the output signal 126.

Referring to step 530, the receiver signal 121 is received by a processing element 150 that includes a state machine 154. The processing element 150 generally controls the operation of the shaping element 140, and may also include a scene estimation element 158, a characterization element 152, a device definition element 160, a device coupling element 162, and a heuristics element 156.

Referring to step 540, the state machine 154 transitions through a plurality of states. A current state is determined by characteristics of a scene and/or a received input or signal. The action performed by the shaping element 140 may be selected corresponding to the current state. The current state may be further determined by a slope of the receiver signal 121, an amplitude of the receiver signal 121, a type of noise present in the receiver signal 121, a plurality of operating parameters of an electronic device or system or environment providing an input, or the like, or combinations thereof. In addition, the current state may be determined by determining a size of the space in which an electronic device is located, whether the electronic device is indoors or outdoors, and the presence of noise sources in the vicinity of the electronic device.

Figure 6:
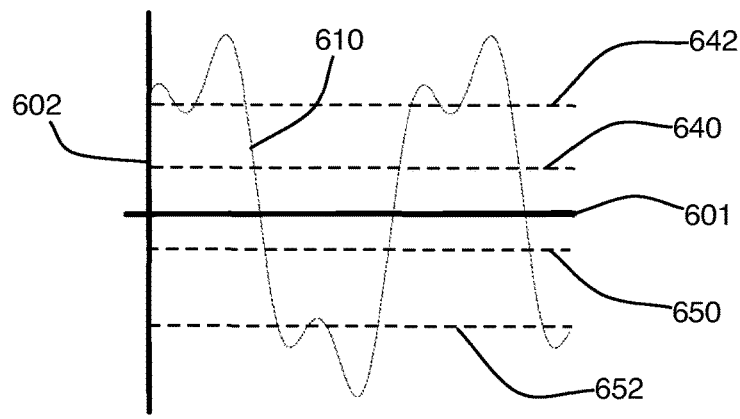
FIGS. 6-8 illustrate exemplary properties of a signal that may be used in determining a state.
Figure 7:
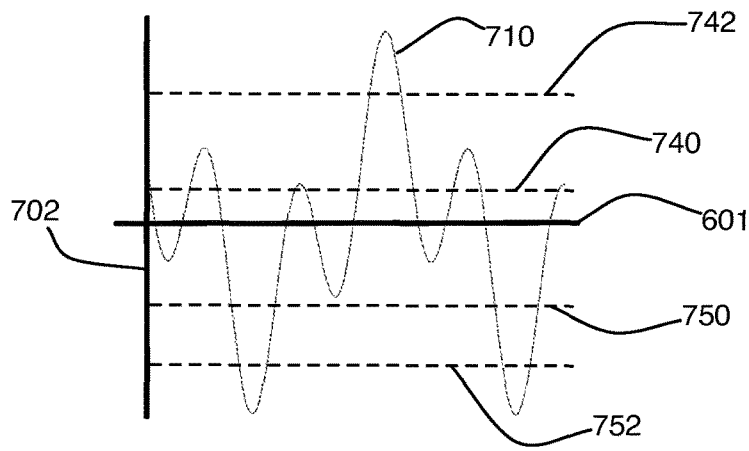
Figure 8:
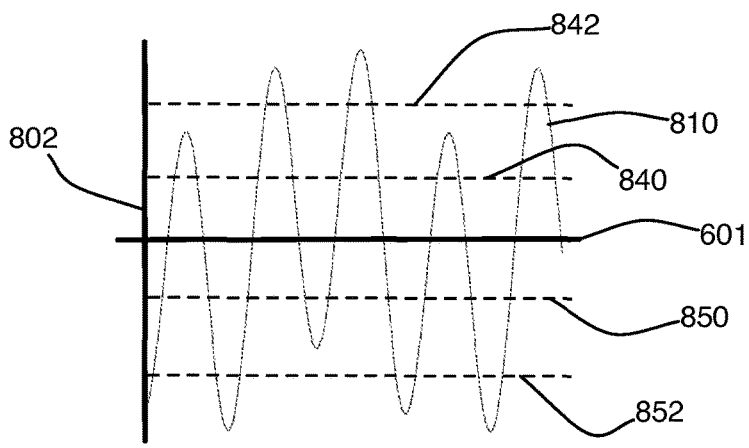

Referring now to FIGS. 6-8, additional examples of state determinations made using properties of a signal are described. FIG. 6 illustrates an example of a signal 610 that could be separated from noise and/or other signals within an input using systems and/or methods in accordance with the present invention. As can be seen in FIG. 6, signal 610 may vary along y-axis, denoted 602, as a function the x-axis, denoted 601. In some examples, signal 610 may vary in amplitude or frequency as a function of time, but in some instances an analysis of variation as a function of parameters other than time, such as frequency, may be desired. As shown in the example of FIG. 6, in a first scene a first threshold 640 and a second threshold 650 may be defined, such that a state is determined based at least in part upon whether signal 610 is greater than first threshold 640, is less than first threshold 640 but greater than second threshold 650, or is less than second threshold 650. Meanwhile, in a second scene a different first threshold 642 and a different second threshold 652 may be defined, with a state determination being based at least in part upon whether the signal 610 is greater than the different first threshold 642, less than the different first threshold 642 and greater than the different second threshold 652, or less than the different second threshold 652.

FIG. 7 illustrates the first derivative 710 of signal 610 to illustrate one example of how the rate of change of a signal, such as signal 610, may be used as at least part of a state determination. In the example of FIG. 7, in a first scene a first threshold 740 and a second threshold 750 have been defined for use, at least in part, in making a state determination. For example, a different state may be determined based upon whether the rate of change of signal 610, illustrated by first derivative 710, is greater than the first threshold 740, is less than the first threshold 740 and greater than the second threshold 750, or is less than the second threshold 750. Similarly, in a second scene a different first threshold 742 and a different second threshold 752 may be used, with a different state determination being made at least in part based upon whether the first derivative 710 of signal 610 is greater than the different first threshold 742, is less than the different first threshold 742 and greater than the different second threshold 752, or less than the different second threshold 752.

FIG. 8 illustrates the second derivative 810 of signal 610, and therefore illustrates the rate at which the first derivative 710 is changing. In a first scene, a first threshold 840 and a second threshold 850 may be defined, and a state determination may be made at least in part upon whether the second derivative 810 of the signal 610 is greater than the first threshold 840, is less than the first threshold 840 but greater than the second threshold 850, or is less than the second threshold 850. In a second scene, a different first threshold 842 and a different second threshold 852 may be defined, such that a state determination may be made at least in part based upon whether the second derivative 810 of the signal 610 is greater than the different second threshold 842, is less than the different first threshold 842 and greater than the different second threshold 852, or less than the different second threshold 852.

The examples depicted in FIGS. 6-8 are illustrative only. Threshold values need not be used for state determinations, and if threshold values are used for state determination the number of threshold and the relative values of those thresholds may vary from those shown in the present examples. More or fewer scenes than two may be used, as well as sub-scenes, sub-sub-scenes, etc., with only some of those having threshold values associated with a state determination at all. Further, a basic threshold value such as shown and described with regard to FIGS. 6-8 need not be used in state determinations in accordance with the present invention. For example, rather than comparing a signal (such as signal 610) or a property of the signal (such as first derivative 710 and/or second derivative 810) to one or more thresholds, the absolute value of a signal or property of the signal. Further, some or all threshold(s) used in a state determination may themselves be varying functions rather than the linear thresholds depicted in the examples of FIGS. 6-8. Further, a state analysis based at least in part upon a signal or a property of a signal may perform operations upon the signal other than those described in the examples of FIGS. 6-8. For example, a received signal may be squared, Fourier transformed, analyzed for the presence/absence of harmonics, or otherwise manipulated prior to or as part of a state determination.

Figure 9:
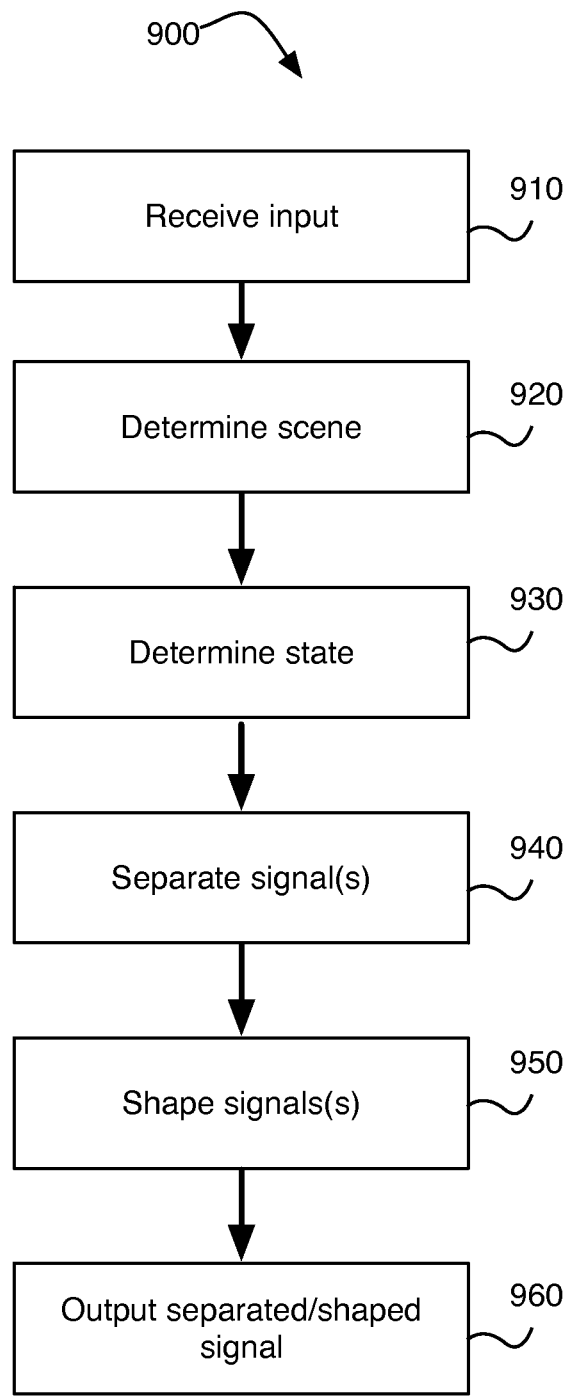
FIG. 9 is a flow diagram of at least a portion of the steps of a method for using scene and/or state information to augment signal processing in accordance with the present invention.

Referring now to FIG. 9, a further method 900 for baseband signal processing in accordance with the present invention is illustrated. Method 900 may begin with step 910 of receiving an input. The input received may be electrical, auditory, optical, radio wave, or any other form. Method 900 may also determine a scene associated with a received input in step 920. Step 920 may further determine a sub-scene, a sub-sub-scene, etc. Step 920 may use the properties of the received input and/or other information, such as location data, time data, and/or other types of data, some examples of which are described herein. Other data may be, for example, data describing speed, the presence of gas, the presence of a chemical compound (or a member of a family of chemical compounds), velocity, orientation, sound, lighting, vibration, pressure, temperature, humidity, other environmental parameters, relative colocation with people, and/or relative colocation with objects. Step 910 and step 920 may occur simultaneously or in any order. A state may be determined in step 930. A state determination in step 930 may be made based upon a received input, a signal identified within a received input, a scene determination, and/or other information. In step 940, one or more signals within a received input may be separated or identified. For example, step 940 may identify a first signal within a voltage input corresponding to an operating dishwasher and a second signal within a voltage input corresponding to an operating sump pump. The manner of processing used in step 940, such as filtering and statistical analysis, may be based at least in part upon the scene determination of step 920 and/or the state determination of step 930. In step 950 a signal may be shaped. The amplification, attenuation, filtering, or other shaping techniques used in step 950 may be based, at least in part, upon the scene determination of step 920 and/or the state determination of step 930. In some embodiments, one or more of step 940 (separating) and step 950 (shaping) may be temporarily or permanently omitted from methods in accordance with the present invention. Finally, in step 960 one or more separated and/or shaped signals may be output. Step 960 may ultimately provide an auditory signal, such as may be useful in a hearing aid, a digital record in any form of transitory or non-transitory computer storage media, an optical signal, a radio frequency signal, a schematic representation, or any other type of output. Step 960 may comprise, for example, separating at least one of a first signal and a second signal from an input. Step 960 may further comprise, for example, identifying a consumer activity and/or an appliance with a particular signal. Step 960 may involve shaping one or more signal instead of or in addition to separating one or more signal from an input, and in some examples the identification of a signal during separation may determine at least in part how the signal is to be shaped.

Systems and methods in accordance with the present invention may use a wide variety of criteria to determine an appropriate scene and/or state. For example, the state of the environment of the system or a device providing an input to a system may be used to make a scene and/or state determination. Further, a taxonomy of events in an environment, a time or phase of an event within an environment, the amplitude of a signal (for example, over a period of time sufficient for transients to dissipate), and/or the properties of a received signal (such as frequency, amplitude, shape, rate of change, etc.), for example. Determining a scene corresponding to a received input may use, for example, one or more of an input profile, a database, crowd sourced data, an ontology library, and/or a taxonomy of events. As described above with regard to examples, based upon a scene and/or state determination, one or more signals may be characterized, identified, separated, shaped, and/or enhanced, or other types of processing may be performed. Examples of processing that may be performed are any type of filtering, amplification, attenuation, and/or addition of signals. Characterization, identification separation, shaping, enhancement, and/or other processing may, in one example, be based upon a power-law function of a domain parameter difference between one or more of the signals within a received input and/or an output. Filtering or other processing may use a variety of filtering techniques, and may use one or more of those techniques in one or multiple modules. For example, systems and methods in accordance with the present invention may use one or more threshold domain filtering module operable to perform threshold domain filtering and at least one additional module operable to perform a selection from the group of multimodal pulse shaping, analog rank filtering, offset rank ordering, analog counting, clustering, singular value decomposition, principal component analysis, independent component analysis, machine learning, k-means, neural network, fuzzy logic, random forest, random committee, and/or random tree. The present invention may provide one or more non-transitory machine-readable medium having instructions that cause a computing device to perform methods in accordance with the present invention.

Systems and methods in accordance with the present invention may be used for a variety of purposes, such as monitoring appliance performance and/or energy or power consumption. The use of scene and/or state determinations may be used to facilitate the identification of warning or alarm situations. For example, a type of behavior by an appliance in one scene (such as from a coffee maker during the morning) may be normal, but the same behavior may be abnormal for a different scene (such as at night). Appliances that may be monitored using systems and methods in accordance with the present invention may be one or more of appliances relating to a HVAC system, furnace, water heater, clothes dryer, cooking range, dishwasher, Jaccuzi, microwave oven, washing machine, toaster, solar panel, solar panel inverter, electric car charger, blow dryer, television, computer, monitor, refrigerator, freezer, garage door opener, thermostat, lighting, sump pump, pool pump, and/or other pump.

Although the invention has been described with reference to the embodiments illustrated in the attached drawing figures, it is noted that equivalents may be employed and substitutions made herein without departing from the scope of the invention as recited in the claims. Systems and methods in accordance with the present invention may be used with baseband systems other than those described in examples herein. Scene and/or state determinations may be made using information in addition to or instead of those described in the present examples. The processing techniques used for separating and/or shaping signals may differ from those described herein. The types of inputs and/or outputs may also differ from the presently described examples. Systems and methods in accordance with the present invention may be incorporated into other devices, such as energy monitoring units, hearing aids, mobile telephones, speakers or headphones, or any other device. Further, systems and methods in accordance with the present invention may be used in conjunction with other devices, rather than being integrated into those devices. The functions described for analyzing, or processing (including, but not limited to, signal separation and signal shaping) may be executed in hardware, software, or a combination of hardware and software.

Having thus described various embodiments of the invention, what is claimed as new and desired to be protected by Letters Patent includes the following:

1. A method for processing a signal, the method comprising:
   receiving an electrical input by at least one processor, the electrical input comprising noise and at least one signal during at least some of the time the electrical input is received, the relative magnitude of the noise and the at least one signal varying during the time the electrical input is received;
   determining, by the at least one processor, a scene corresponding to the received electrical input, the scene dependent upon at least one condition external to the at least one signal in the received electrical input;
   identifying, by the at least one processor, the at least one signal in the received electrical input;
   analyzing, by the at least one processor, the at least one signal to determine a state dependent upon at least one characteristic of the at least one signal;
   processing, by the at least one processor, the received electrical input and the at least one signal within the received electrical input based upon both the determined scene corresponding to the received electrical input and the determined state of the at least one signal to create a processed signal; and
   outputting, by the at least one processor, the processed signal derived from the at least one signal in the received electrical input,
   wherein processing the received input and the at least one signal within the received input comprises separating the at least one signal from the received input,
   wherein the at least one signal separated from the received electrical input comprises at least one signal of at least one electrical appliance operating on an electrical system, and
   wherein the at least one electrical appliance comprises at least one of: an HVAC system, a furnace, a water heater, a clothes dryer, a cooking range, a dishwasher, a hot tub, a microwave oven, a washing machine, a toaster, a solar panel, a solar panel inverter, an electric car charger, a blow dryer, a television, a computer, a monitor, a refrigerator, a freezer, a garage door opener, a thermostat, lighting, a sump pump, a pool pump, or a pump.

2. The method of claim 1, wherein processing the received electrical input and the at least one signal within the received electrical input comprises shaping the at least one signal.

3. The method of claim 2, wherein shaping the at least one signal comprises selecting a shaping operation that corresponds to the determined state of the signal.

4. The method of claim 1, wherein analyzing the at least one signal to determine a state dependent upon at least one characteristic of the signal comprises determining whether the magnitude of the signal falls within at least one defined range.

5. The method of claim 4, wherein the at least one defined range is determined at least partially based upon the scene determined to correspond to the received electrical input.

6. The method of claim 1, wherein analyzing the at least one signal to determine a state dependent upon at least one characteristic of the signal comprises determining whether the rate of change of the signal falls within at least one defined range.

7. The method of claim 6, wherein the at least one defined range is determined at least partially based upon the scene determined to correspond to the received electrical input.

8. The method of claim 1, wherein analyzing the at least one signal to determine a state dependent upon at least one characteristic of the signal further comprises analyzing the at least one signal to determine a state dependent upon at least two characteristics of the signal.

9. The method of claim 1, wherein analyzing the at least one signal to determine a state dependent upon at least one characteristic of the signal further comprises analyzing the at least one signal to determine a state dependent upon at least one characteristic of the signal and dependent upon the scene corresponding to the received electrical input.

10. The method of claim 1, wherein analyzing the at least one signal to determine a state dependent upon at least one characteristic of the signal further comprises identifying an event in the at least one signal.

11. The method of claim 1, wherein determining a scene corresponding to the received electrical input comprises using at least one time to determine the scene.

12. The method of claim 1, wherein determining a scene corresponding to the received electrical input comprises using at least one location to determine the scene.

13. The method of claim 1, wherein determining a scene corresponding to the received electrical input comprises using data describing an attribute to determine the scene, the attribute comprising at least one of: speed, the presence of gas, the presence of a chemical compound, velocity, orientation, sound, lighting, vibration, temperature, humidity, environmental parameters, relative colocation with specified people, and relative colocation with specified objects.

14. The method of claim 1, wherein determining a scene corresponding to the received electrical input comprises using at least one of: an input profile, a database, crowd-sourced data, an ontology library, and a taxonomy to determine the scene.

15. A system configured to perform baseband signal processing, the system comprising:
a receiver configured to receive an electrical input;
at least one processor configured to:
associate the received electrical input with a scene based at least in part upon information not within the received electrical input;
assign a state to at least one signal identified within the received electrical input, the assigned state being based at least in part upon the at least one signal;
process the at least one signal identified within the received electrical input based upon at least one of the scene and the state to create a processed signal; and
output the processed signal,
wherein the at least one signal within the received electrical input comprises multiple signals and the at least one processor is further configured to separate the multiple signals within the received electrical input into distinct signals,
wherein the distinct signals separated from the received electrical input comprises at least one signal of at least one electrical appliance operating on an electrical system, and
wherein the at least one electrical appliance comprises at least one of: an HVAC system, a furnace, a water heater, a clothes dryer, a cooking range, a dishwasher, a hot tub, a microwave oven, a washing machine, a toaster, a solar panel, a solar panel inverter, an electric car charger, a blow dryer, a television, a computer, a monitor, a refrigerator, a freezer, a garage door opener, a thermostat, lighting, a sump pump, a pool pump, or a pump.

16. The system of claim 15, wherein the at least one processor is further configured to shape the at least one signal identified within the received electrical input.

17. The system of claim 15, wherein the at least one processor is further configured to associate the received electrical input with the scene using at least one of an apparatus environment, a taxonomy of events within the apparatus environment, and the amplitude of at least one signal within the received electrical input within a time to compensate.

18. At least one non-transitory machine-readable medium having instructions that cause at least one computing device to perform a method of processing a signal, the method comprising:
receiving an electrical input, the electrical input comprising noise and at least one signal during at least some of the time the electrical input is received, the relative magnitude of the noise and the at least one signal varying during the time the electrical input is received;
determining a scene corresponding to the received electrical input, the scene dependent upon at least one condition external to the at least one signal in the received electrical input;
identifying the at least one signal in the received electrical input;
analyzing the at least one signal to determine a state dependent upon at least one characteristic of the at least one signal;
processing the received electrical input and the at least one signal within the received electrical input based upon both the determined scene corresponding to the received electrical input and the determined state of the at least one signal to create a processed signal; and
outputting the processed signal derived from the at least one signal in the received electrical input,
wherein processing the received input and the at least one signal within the received input comprises separating the at least one signal from the received input,
wherein the at least one signal separated from the received electrical input comprises at least one signal of at least one electrical appliance operating on an electrical system, and
wherein the at least one electrical appliance comprises at least one of: an HVAC system, a furnace, a water heater, a clothes dryer, a cooking range, a dishwasher, a hot tub, a microwave oven, a washing machine, a toaster, a solar panel, a solar panel inverter, an electric car charger, a blow dryer, a television, a computer, a monitor, a refrigerator, a freezer, a garage door opener, a thermostat, lighting, a sump pump, a pool pump, or a pump.

19. The at least one non-transitory machine-readable medium of claim 18, wherein processing the received electrical input and the at least one signal within the received electrical input comprises shaping the at least one signal.

20. A method for processing a signal, the method comprising:
receiving an electrical input by at least one processor, the electrical input comprising noise and at least one signal during at least some of the time the electrical input is received, the relative magnitude of the noise and the at least one signal varying during the time the electrical input is received;

determining, by the at least one processor, a scene corresponding to the received electrical input, the scene dependent upon at least one condition external to the at least one signal in the received electrical input;

identifying, by the at least one processor, the at least one signal in the received electrical input;

analyzing, by the at least one processor, the at least one signal to determine a state dependent upon at least one characteristic of the at least one signal;

processing, by the at least one processor, the received electrical input and the at least one signal within the received electrical input based upon both the determined scene corresponding to the received electrical input and the determined state of the at least one signal to create a processed signal; and outputting, by the at least one processor, the processed signal derived from the at least one signal in the received electrical input, wherein processing the received input and the at least one signal within the received input comprises separating the at least one signal from the received input, wherein the at least one signal separated from the received electrical input comprises at least one signal of a least one electrical appliance operating on an electrical system, and wherein the at least one signal of the at least one electrical appliance is further processed to identify a potential error or fault condition in the at least one electrical appliance.

* * * * *